Oct. 26, 1943.  A. SLATIS  2,332,537
METHOD OF COMPRESSION MOLDING
Filed Feb. 20, 1941
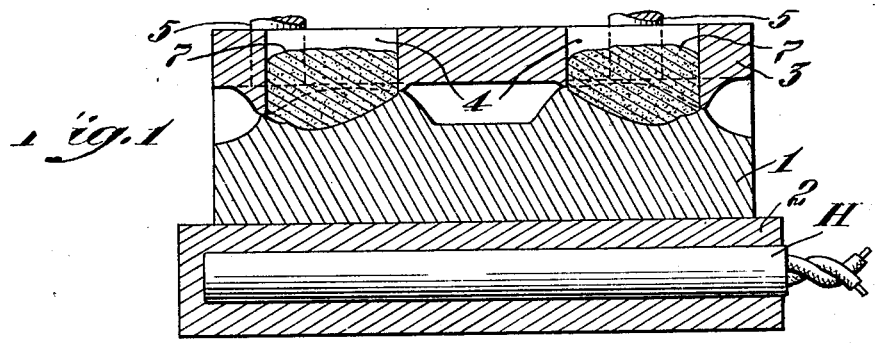
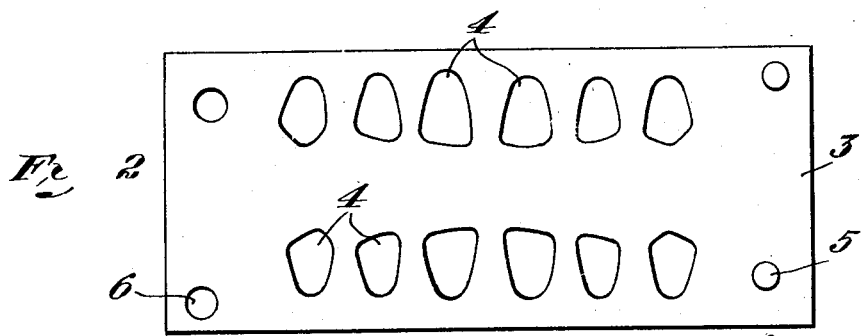
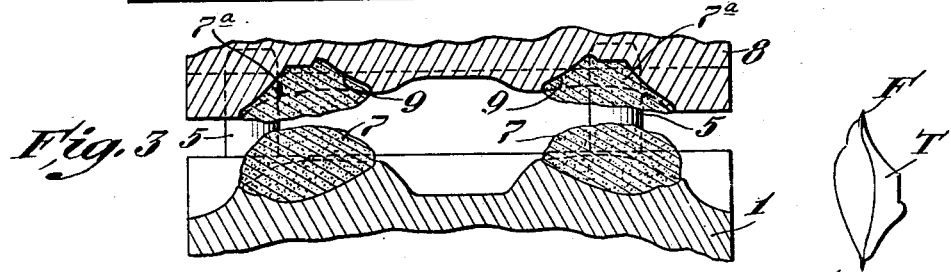
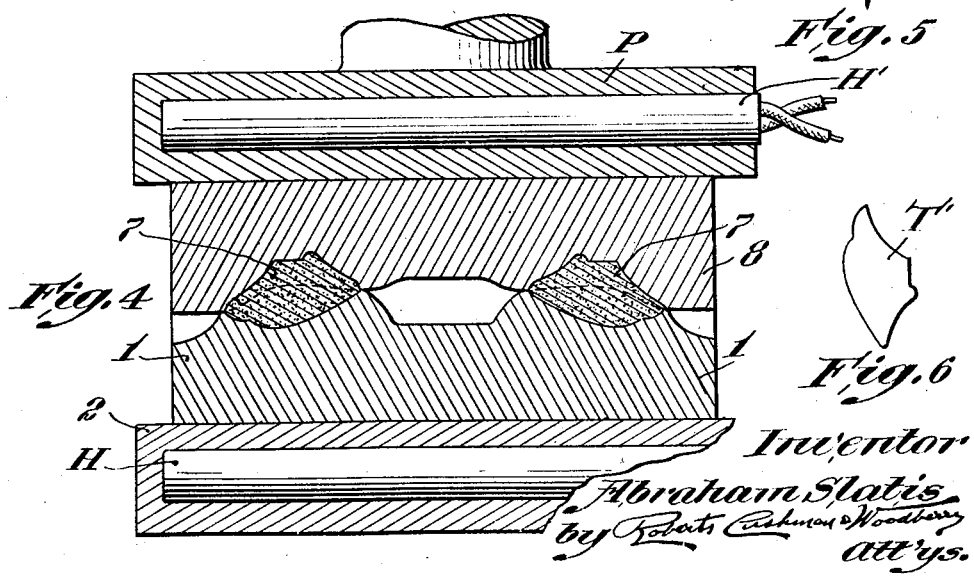
Inventor
Abraham Slatis
by Roberts Cushman & Woodberry
att'ys.

Patented Oct. 26, 1943

2,332,537

UNITED STATES PATENT OFFICE 2,332,537

METHOD OF COMPRESSION MOLDING

Abraham Slatis, Chicago, Ill.

Application February 20, 1941, Serial No. 379,757

7 Claims. (Cl. 18—55.1)

This invention pertains to the manufacture of small articles, for example artificial teeth, by molding them from a plastic substance, for instance a substance of the synthetic resin type and relates more especially to a novel method of making such articles by compression-molding and to novel apparatus for use in the practice of such method.

In the manufacture of small articles by the compression molding of partially polymerized material in powdered form, for instance synthetic "A" resins of the phenol-formaldehyde or methylacrylic acid types it has heretofore been considered necessary to employ a mold provided with a plunger capable of advancing toward the mold cavity as the operation progresses, in order to compensate for the very pronounced decrease in volume of the powdered material as the latter first gels and then sets. Except by the use of such a plunger or its equivalent the shrinkage of the plastic material within the mold cavity, in accordance with prior molding methods, results in the production of a misshapen article or one which lacks density and strength,—the only remedy being to return the molded article to the mold with additional plastic and repeat the operation, which necessarily adds to the expense and even then cannot be depended upon to produce wholly satisfactory results.

The principal object of the present invention is to provide a method whereby small articles, particularly those comprising portions which are of different colors, for instance artificial teeth, imitation jewelry, ornaments, etc., may be compression-molded from plastic molding powders or other normally fluent materials by the use of ordinary molds such as are commonly employed in molding ceramic materials for instance, thereby reducing cost as compared with molding in plunger molds, but without sacrifice of quality of product.

A further object of the invention is to provide a method of compression-molding small articles such as artificial teeth whereby the finished article may be smooth and of exact shape and devoid of any of the defects which commonly result from the use of the plunger-type mold.

A further object of the invention is to produce novel apparatus for use in the practice of the method herein disclosed and which facilitates the molding of small articles in ordinary molds (as contrasted with plunger molds) expeditiously and without substantial loss of material and to substantially uniform shape and density.

Other and further objects and advantages of the invention will be pointed out in the following more detailed description and by reference to the accompanying drawing wherein:

Fig. 1 is a vertical section through one block of a two-part tooth mold showing associated therewith the improved molding appliance of the present invention, and showing the mold block mounted upon a suitable heating device;

Fig. 2 is a plan view of the molding appliance of the present invention shown removed from the mold block;

Fig. 3 is a vertical section showing the upper and lower tooth mold blocks with masses of moldable material seated in the mold cavities and with the upper mold block disposed in substantial registry with the lower block and in readiness to be placed thereon;

Fig. 4 is a view generally similar to Fig. 3 but showing the upper and lower mold blocks operatively assembled, the lower block being mounted on heating means and the upper block having resting thereon a heated press plunger;

Fig. 5 is a side elevation of a tooth as it appears when removed from the mold assembly of Fig. 4 after the completion of the molding operation; and Fig. 6 is a similar elevation of the completed tooth after removal of the parting fin or "flash."

Referring to the drawing, the numeral I designates one of the blocks of a two-part tooth mold, the block I being here shown for convenience as the labial block, that is to say, the block which has the labial mold cavities therein. The block I is shown in Fig. 1 as resting upon a heater device 2 provided with electrical heating units H in order that the mold block I may be heated. While this mode of heating the block is suggested as desirable, it is obvious that it may be heated in any other convenient way, for example the block may be preheated in an oven, or may be furnished with internal heating units.

Associated with the mold block I is the novel confiner of the present invention. This confiner 3 is in fact a reservoir for holding a supply of the material to be molded. As illustrated, the part 3 is a solid block, for example cast metal, of substantially the same horizontal shape and dimensions as the mold block I and having passages or wells 4 extending through its entire thickness and which are designed to register with the mold cavities in the block I. While the passages or wells 4 need not necessarily be of the same horizontal contour as the corresponding mold cavities, they are so illustrated in Fig. 2. Preferably this confiner 3 is provided with pins 5 and openings 6 designed respectively to engage corresponding openings and pins in the mold block I in order that the part 3 may be properly registered with the mold block when in use.

In using the confiner 3, it is placed upon the mold block I as shown in Fig. 1, with the openings 4 in registry with the mold cavities. Fluent moldable material 7, for instance partially polymerized resinous material in granular or powdered form, is poured into the wells 4 so as completely to fill the mold cavity and with a surplus such as partially or completely to fill the wells 4. The powdered material amy be of a type to provide a molded article of any desired color, and by using powders of different colors to form successive strata in the mold cavity and well, a multi-colored article may be produced.

In the process of making teeth or similar articles from plastics of the synthetic resin type, it is customary to provide the moldable material in powdered form but it is substantially impossible, in accordance with prior methods, to pile more than a certain definite amount of this fluent material into the mold cavities, by reason of its tendency to flow away if piled beyond a certain depth. By the employment of the present arrangement, in which the confiner 3 is of substantial vertical depth, it is possible, not only to fill the mold cavities with this material, but also to provide a substantial surplus directly above the mold cavities in the walls 4 of the confiner 3. If desired, the vertical thickness of the part 3 may be such that if the passage or well 4 be filled level to the top with the powdered material, the operator may know that exactly the proper amount has been supplied to insure the formation of the desired article. On the other hand, the part 3 may be of a depth such that the well need not necessarily be filled completely and the employment of a suitable measuring device or even the experience of the operator may be depended upon to place the proper amount of material within the wells 4 so that there will be enough to compensate completely for decrease in volume during the subsequent stages of molding.

After the material has been placed in the wells 4 it is allowed to remain until the heat from the mold 1 has caused this powdered material to coalesce to some extent, usually to the gel state, so that the mass will substantially preverse its shape when the confiner 3 is removed.

Thus far, the description has related to the provision of the shape-retaining masses in the cavities of the labial block 1, but it will be understood that in accordance with a preferred embodiment of the invention, similar coherent masses 7a of the moldable material (but, if desired, of different color or other characteristics from the masses 7) will be provided in the cavities of block 8 with the assistant of a confiner 3 and following the same general procedure just above described.

After the confiner has been removed, the mold blocks with their heaped up masses 7 and 7a of material are preferably placed in an oven where the plastic material is heated until it becomes sufficiently adherent to the mold to permit inversion of the mold without dropping the mass therefrom.

The block 8 is now inverted and placed in registry with the lower block 1, the upper block having pins and openings corresponding to the pins 5 and openings 6 of the confiner 3. The masses 7a of material in the mold cavities 9 of the upper block thus register with the masses of material 7 seated in the mold cavities of the lower block. The upper block 8 is moved downwardly, and while the lower block 1 is still maintained upon a suitable fixed support 2, preferably heated, the upper block is subjected to pressure, for example by the movable platen P of a press, the platen also preferably being heated, for example by heating units H'. The masses 7, 7a of moldable material are thus subjected to heat and pressure, and since these combined masses are initially more than sufficient to fill the assembled mold cavities of the two blocks, the shrinkage which takes place during the final compression of the material and its setting to form a solid, dense mass is not such as to leave any spaces, but, on the other hand, there usually results from the compression and heating a slight extrusion of the material at the parting line between the mold blocks. Thus when the mold blocks are separated and the teeth T (Fig. 5) are removed, there may be a slight thin fin or flash F extending more or less completely around the tooth. However, this fin may easily be removed by the use of a burr wheel or otherwise; and the tooth may be polished and smoothly finished so that the resultant completed tooth T' (Fig. 6) is smooth and accurately follows the contour of the mold cavity, the tooth being of the desired density and being strong and wear-resistant.

While in the preferred procedure as above described both of the complemental cavities are furnished with masses of the moldable material before the mold parts are assembled, it is contemplated that in molding certain types of article, for instance where one of the mold cavities is very shallow, it may not be necessary to deposit moldable material in but one of the complemental mold cavities before assembling the mold parts.

The foregoing description has been directed to the making of artificial teeth, by way of illustration, but it is obvious that by the use of properly shaped mold cavities, other articles may be made in the same way.

While one desirable embodiment of the invention has herein been illustrated by way of example, it is to be understood that the invention is not necessarily limited to this precise arrangement but it to be regarded as broadly inclusive of any and all equivalent constructions.

I claim:

1. Method of compression-molding small articles in ordinary multi-part molds from powdered, partially polymerized, resinous, moldable material which substantially decreases in volume during subsequent stages of the molding operation, said method comprising as steps providing separable mold parts having complemental mold cavities each of fixed dimensions, arranging one at least of said mold parts so that its mold cavity opens upwardly, piling into said mold cavity mass of the moldable material such as completely to fill the cavity and to provide a surplus sufficient to compensate for shrinkage of the material and to ensure a full mold cavity at the completion of the operation, confining such quantity of material within said mold cavity and in the space immediately above said cavity while heating the material sufficiently to cause its constituent particles to cohere, disposing the other mold part in registry with and above the first mold part, urging said mold parts towards each other while concomitantly heating the molded material thereby to cause such material to assume the contour of the assembled mold cavities and to set and become hard and shape-retaining, and thereafter removing the molded article from the mold.

2. Method of compression-molding small articles in ordinary multi-part molds from powdered, partially polymerized, resinous, moldable material which comprises as steps providing separable mold parts having complemental mold cavities each of fixed dimensions, arranging each of said mold parts so that its mold cavity opens upwardly, associating with each mold part a confiner having therein a well which registers with the corresponding mold cavity, pouring into each well sufficient of the moldable material to fill the corresponding cavity and at least partially to fill the well, causing the constituent particles of the moldable material to cohere, removing the confiners while leaving the heaped up moldable material seated in the mold cavities, subjecting the material seated in the mold cavities to heat sufficient to cause the material partially to gel and adhere to the wall of the mold cavity, inverting one of the mold parts and associating it with the first mold part, and urging the mold parts towards each other thereby to cause the moldable material to assume the contour of the assembled mold cavities.

3. Method of compression-molding small articles in ordinary multi-part molds from powdered, partially polymerized, resinous, moldable material which comprises as steps providing separable mold parts having complemental mold cavities each of fixed dimensions, arranging each of said mold parts so that its mold cavity opens upwardly, associating with each mold part a confiner having therein a passage which extends through its entire thickness and which registers with the corresponding mold cavity, causing moldable material to enter each mold cavity through the corresponding passage and to fill each mold cavity and at least partially to fill the passage, subjecting the moldable material to heat sufficient to cause it to retain its shape when the confiner is removed, separating the confiner from each mold part while leaving the moldable material seated in the corresponding mold cavity, heating the mass of material in the respective mold cavities until it becomes sufficiently coherent and adherent to the mold to permit inversion of the mold without dropping the material therefrom, inverting one mold part and assembling it with the other, and subjecting the moldable material to heat and pressure thereby to conform it to the contour of the assembled mold cavities and to cause it to set.

4. Method of compression-molding small articles in ordinary multi-part molds from a normally fluent moldable material in a powdered form and of a type which decreases substantially in volume during molding, said method comprising as steps providing separable mold parts having complemental mold cavities each of fixed dimensions, piling into the mold cavity of one of said mold parts a mass of the moldable material such as completely to fill the cavity and to provide a surplus sufficient to compensate for shrinkage of the material and to ensure the complete filling of both complemental mold cavities at the completion of the molding operation, causing the constituent particles of the mass of moldable material to become sufficiently coherent so that said mass will not disintegrate during assemblage of the other mold part or parts with the first, assembling the several mold parts so as to confine said mass of material within the assembled mold cavities, and subjecting said mass of material to pressure thereby to conform it to the contour of the assembled cavities.

5. Method of compression-molding small articles in ordinary multi-part molds from moldable material in powder form and of a type which decreases in volume substantially during molding, said method comprising as steps providing separable mold parts having complemental mold cavities each of fixed dimensions, disposing in each mold cavity a mass of the moldable material such as completely to fill the cavity and to provide a surplus sufficient to compensate for shrinkage of the material and to ensure a full mold cavity at the completion of the operation, causing the particles constituting said mass of material to coalesce sufficiently and to become so adherent to the mold in which it is seated that the mass will not disintegrate or drop out when said mold part is inverted, inverting one of said mold parts and assembling it with the other, and subjecting said masses of material to heat and pressure within the assembled mold cavities thereby to cause them to assume the contour of said cavities and to set and become hard.

6. Method of compression-molding small articles from powdered material which substantially shrinks in volume during the molding operation, said method being carried out in ordinary multi-part molds and comprising as steps providing separable mold parts having complemental mold cavities each of fixed dimensions, confining a mass of initially fluent, moldable powdered material, whose volume exceeds the capacity of the assembled mold cavities, within and in the space directly above the mold cavity of one at least of said mold parts, causing said mass of material to become sufficiently shape-retaining while so confined as to prevent its disintegration when released from such confinement, releasing said mass from such confinement, so assembling the several mold parts that their respective cavities face each other, and subjecting said mass of material to pressure within the assembled mold cavities.

7. Method of compression-molding small articles in ordinary multi-part molds from moldable material in powder form and of a type which decreases substantially in volume during molding, said method comprising as steps providing separable mold parts having complemental mold cavities each of fixed dimensions, confining a mass of the powdered moldable material, of such volume as completely to fill the cavity and to provide a surplus sufficient to compensate for shrinkage of the material and to ensure a full mold cavity at the completion of the operation, within and in the space immediately above each mold cavity, causing the particles of said body of material to cohere sufficiently to prevent disintegration of said body when relieved from such confinement, relieving said body from such confinement, heating each body of material until it becomes coherent and adherent to the wall of the cavity, so assembling the mold parts that their respective cavities face each other, and subjecting said bodies to pressure between the assembled mold parts thereby to conform them to the contour of the assembled mold cavities.

ABRAHAM SLATIS.